US010024559B2

(12) United States Patent
Gwak et al.

(10) Patent No.: US 10,024,559 B2
(45) Date of Patent: Jul. 17, 2018

(54) HUMIDIFIER (71) Applicant: LG ELECTRONICS INC., Seoul (KR)

(72) Inventors: Jongseong Gwak, Seoul (KR); Jihye Ahn, Seoul (KR); Hojung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 15/102,619

(22) PCT Filed: Dec. 9, 2014

(86) PCT No.: PCT/KR2014/012080
§ 371 (c)(1),
(2) Date: Jun. 8, 2016

(87) PCT Pub. No.: WO2015/099323
PCT Pub. Date: Jul. 2, 2015

(65) Prior Publication Data
US 2018/0135876 A1 May 17, 2018

(30) Foreign Application Priority Data
Dec. 26, 2013 (KR) ........................ 10-2013-0163502

(51) Int. Cl.
*F24F 3/00* (2006.01)
*B01F 3/04* (2006.01)
*F24F 6/16* (2006.01)
*C02F 1/32* (2006.01)
*F24F 3/14* (2006.01)
*F24F 6/00* (2006.01)

(52) U.S. Cl.
CPC ............. *F24F 6/16* (2013.01); *B01F 3/04007* (2013.01); *C02F 1/325* (2013.01); *F24F 3/14* (2013.01); *C02F 2201/326* (2013.01); *C02F 2201/3222* (2013.01); *C02F 2209/006* (2013.01); *C02F 2209/42* (2013.01); *C02F 2307/12* (2013.01); *F24F 2006/006* (2013.01)

(58) Field of Classification Search
CPC ............ F24F 3/14; B01F 3/04; B01F 3/04007
USPC .......................................... 261/24, 30, 72.1
See application file for complete search history.

(56) References Cited

U.S. PATENT DOCUMENTS

2012/0319311 A1\* 12/2012 Nutter ...................... F24F 6/02
261/72.1

FOREIGN PATENT DOCUMENTS

| CN | 1392374 | 1/2003 |
| CN | 2771707 | 4/2006 |
| CN | 201770513 | 3/2011 |
| CN | 202973415 | 6/2013 |
| CN | 203024315 | 6/2013 |
| JP | 2005-274097 A | 10/2005 |
| JP | 2005-344979 A | 12/2005 |
| JP | 2007139251 A \* | 6/2007 ................ F24F 6/06 |

(Continued)

OTHER PUBLICATIONS

International Search Report dated Mar. 16, 2015 issued in Application No. PCT/KR2014/012080.
Chinese Office Action dated Mar. 26, 2018. (Translation).

*Primary Examiner* — Robert A Hopkins
(74) *Attorney, Agent, or Firm* — Ked & Associates LLP (57) ABSTRACT

Provided is a humidifier. The humidifier includes a sterilizer for sterilizing water stored in a tray.

20 Claims, 9 Drawing Sheets

(56) References Cited

FOREIGN PATENT DOCUMENTS

| | | |
|---|---|---|
| JP | 2008-224188 A | 9/2008 |
| JP | 2013-155995 | 8/2013 |
| KR | 10-2011-0070183 A | 6/2011 |

\* cited by examiner

HUMIDIFIER

CROSS-REFERENCE TO RELATED PATENT APPLICATIONS

This application is a U.S. National Stage Application under 35 U.S.C § 371 of PCT Application No. PCT/KR2014/012080, filed Dec. 9, 2014, which claims priority to Korean Patent Application 10-2013-0163502, filed Dec. 26, 2013, whose entire disclosures are hereby incorporated by reference.

TECHNICAL FIELD

The present disclosure relates to a humidifier.

BACKGROUND ART

In general, humidifiers are devices for discharging air containing moisture to raise humidity in indoor air. Humidifiers may be classified into ultrasonic humidifiers using ultrasonic vibration and natural vaporizing humidifiers in which flowing air contacts moisture to allow the air to contain the moisture.

A humidification air cleaner including a UV lamp is disclosed in Korean Patent Publication No. 2012-0075997 that is a prior document.

In the humidification air cleaner, a UV lamp is disposed under an upper case. Also, a storage part in which water is stored is disposed under the upper case.

The UV lamp irradiates UV rays onto air introduced into an air inflow hole defined in the upper case and the water stored in a lower case to sterilize the air and water.

However, the UV lamp according to the related art may be deteriorated in sterilization performance in comparison to an output. Thus, to secure the sterilization performance, a lamp module has to increase in output or size.

Also, the UV lamp is too far from the water stored in the lower case to deteriorate the sterilization performance.

DISCLOSURE OF INVENTION

Technical Problem

Embodiments provide a humidifier having improved sterilization performance with respect to stored water.

Solution to Problem

In one embodiment, a humidifier includes: a tray in which water for humidification is stored; a humidification assembly disposed on one side of the tray to operate for the humidification; and a sterilizer disposed on the tray to sterilize the water stored in the tray, wherein the sterilizer includes a light emitting unit irradiating UV rays and a printed circuit board on which the light emitting unit is disposed, and the light emitting unit is disposed at a position that is lower than a maximum water level of the water stored in the tray.

The light emitting unit may irradiate UV rays having a UV-C wavelength band.

The humidifier may further include: a water level sensor detecting a water level of the water stored in the tray; and a control unit controlling a turn-on time of the light emitting unit on the basis of the water level detected by the water level sensor.

The control unit may control the turn-on time so that the turn-on time of the light emitting unit gradually decreases when the water level detected by the water level sensor gradually decreases.

The humidifier may further include a case assembly guiding a flow of air for the humidification, wherein the sterilizer may further include a wire connected to the printed circuit board and a terminal connected to the wire, and the case assembly may include a contact plate connected to the control unit and the terminal.

The sterilizer may further include a body surrounding the light emitting unit and the printed circuit board, and the terminal may pass through the body to contact the contact plate.

The terminal may pass through the tray to contact the contact plate.

The sterilizer may be separably mounted on an inner surface of the tray to contact the water stored in the tray.

The sterilizer may include a transmission part through which the UV rays irradiated from the light emitting unit is transmitted, and the sterilizer may further include a body accommodating the printed circuit board.

The transmission part may include a hole, and a sealing member for blocking an inflow of the water may be disposed between an inner surface of the body and the printed circuit board.

The transmission part may be formed of a transparent or translucent material to allow the UV rays irradiated from the light emitting unit to be transmitted therethrough.

A guide rib may be disposed on the body, and a guide part coupled to the guide rib may be disposed on the tray.

The tray may include a body including a transmission part and defining a space in which the water is stored, and the sterilizer may be mounted outside the space in which the water is stored.

A mount guide for guiding the mounting of the sterilizer may be disposed on the tray, and a guide protrusion inserted into the mount guide may be disposed on the printed circuit board.

A support part supporting the printed circuit board may be disposed on the tray.

The tray may include an inner body including the transmission part and an outer body coupled to the inner body, and the sterilizer may be disposed between the inner body and the outer body.

The humidification assembly may include a rotation shaft and a plurality of disks connected to the rotation shaft to rotate together with the rotation shaft, and the sterilizer may be disposed on a circumferential wall that extends in parallel to the rotation shaft.

In another embodiment, a humidifier includes: a base; a tray seated on the base; a disk assembly seated on the tray, the disk assembly including a rotation shaft and a plurality of disks connected to the rotation shaft; and a sterilizer disposed on the tray, the sterilizer including a light emitting unit irradiating UV rays onto water stored in the tray, wherein the light emitting unit is disposed lower than the rotation shaft.

The light emitting unit may irradiate UV rays having a UV-C wavelength band.

The sterilizer may be disposed on a wall of the tray, which is disposed in parallel to the rotation shaft.

Advantageous Effects of Invention

According to the embodiments, since the UV rays are directly irradiated onto the water stored in the tray, the sterilization effect with respect to the water stored in the stray may be maximized.

MODE FOR THE INVENTION

Preferred embodiments of the present disclosure will be described below in more detail with reference to the accompanying drawings. Note that the same or similar components in the drawings are designated by the same reference numerals as far as possible even if they are shown in different drawings. In the following description of the present disclosure, a detailed description of known functions and configurations incorporated herein will be omitted to avoid making the subject matter of the present disclosure unclear.

In the description of the elements of the present disclosure, the terms 'first', 'second', 'A', 'B', '(a)', and '(b)' may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

Figure 1:
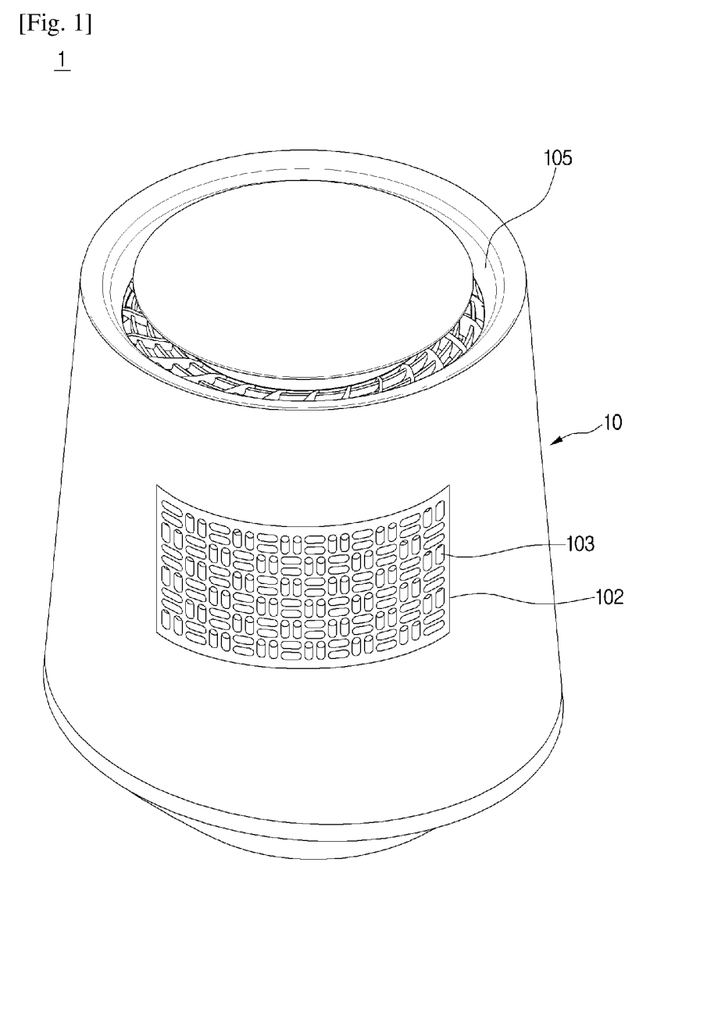
FIG. 1 is a perspective view of a humidifier according to an embodiment.
Figure 2:
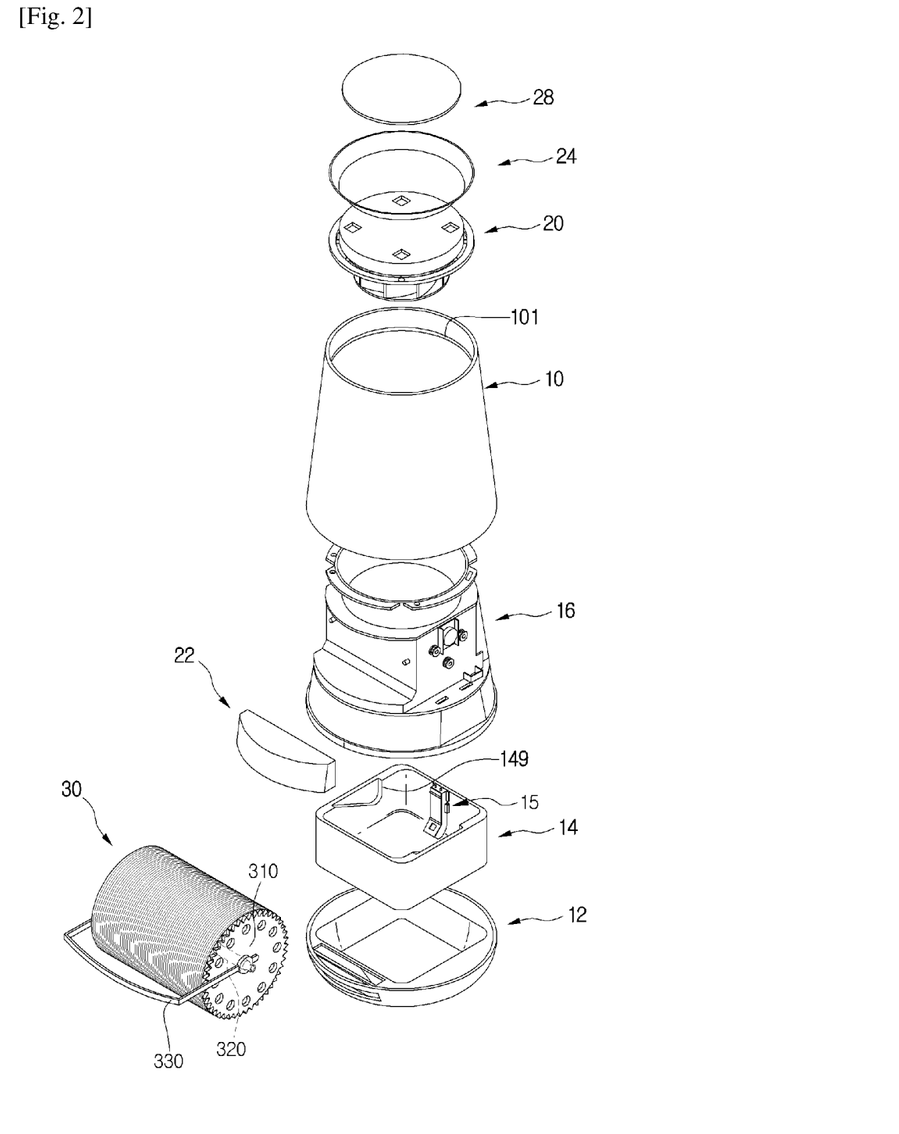
FIG. 2 is an exploded perspective view of the humidifier according to an embodiment.

FIG. 1 is a perspective view of a humidifier according to an embodiment, and FIG. 2 is an exploded perspective view of the humidifier according to an embodiment.

Referring to FIGS. 1 and 2, a humidifier 1 according to the current embodiment includes a main body and a base 12 on which the main body is seated. The main body includes a housing 10 defining an exterior thereof.

Also, the main body may include a tray 14 in which water is stored, a case assembly 16 for guiding a flow of air within the housing 10, a fan motor assembly 20 for blowing the air, and a control unit 22 for controlling an operation of the humidifier 1.

Also, the main body may include a deco member 24 coupled to an upper portion of the housing 10, an input panel 28 seated on the fan motor assembly 20 to receive a manipulation command of the humidifier 1, and a disk assembly 30 disposed on one side of the tray 14.

The main body may include a discharge hole 105 through which humidified air is discharged. The discharge hole may have a closed-loop shape when viewed from a top surface of the main body. For example, the discharge hole 105 may have a circular ring shape, but is not limited thereto.

The housing 10 has opened upper and lower portions. That is, the housing 10 includes an upper opening and a lower opening.

The housing 10 may include a suction grill 102 having a suction hole 103 through which air is introduced. The suction grill 102 may be separably coupled to the housing 10.

The upper opening of the housing 10 may provide a passage through the humidified air passes.

A seat end 101 on which the fan motor assembly 16 is disposed on an upper portion of an inner circumferential surface of the housing 10.

A seat groove 149 into which water for humidification is store, and the disk assembly is seated may be defined in the tray 14. A sterilizer 15 for sterilizing the stored water may be disposed on one side of the tray 14.

The disk assembly 30 may include a plurality of disks 310 connected to a rotation shaft 320 and a handle 330 connected to the rotation shaft 320. The rotation shaft 320 passes through the plurality of disks 310.

In the state where the disk assembly 30 is seated on the tray 14, at least one portion of the plurality of disks 310 may be sunk into the water stored in the tray 14.

Figure 3:
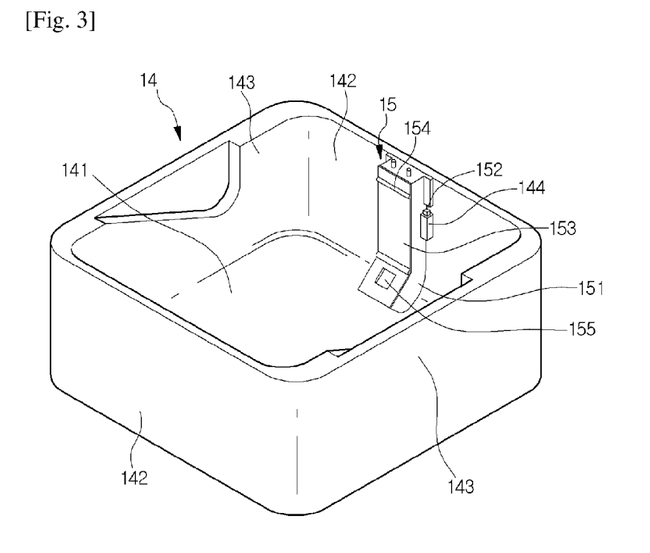
FIG. 3 is a perspective view of a tray according to an embodiment.
Figure 4:
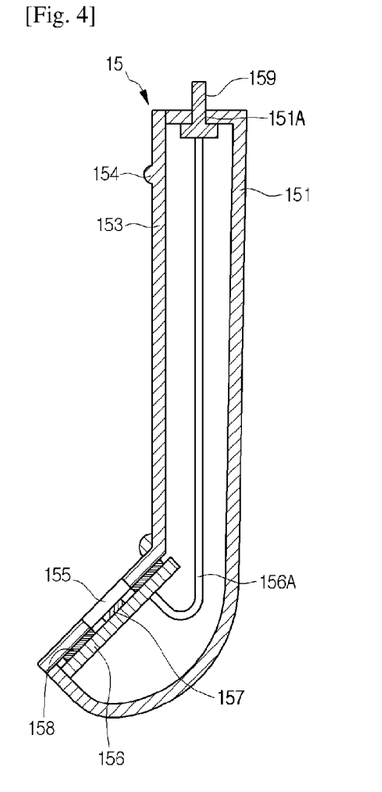
FIG. 4 is a cross-sectional view of a sterilizer according to a third embodiment.

FIG. 3 is a perspective view of a tray according to an embodiment, and FIG. 4 is a cross-sectional view of a sterilizer according to a third embodiment.

Referring to FIGS. 3 and 4, the tray 14 may include a bottom wall 141 and a circumferential wall vertically extending from the bottom surface 141.

The circumferential wall may include a pair of first walls 142 that are parallel to each other and a pair of second walls 143 that cross the pair of first walls 142. A seat groove 149 in which the disk assembly 30 is seated is defined in each of the pair of second walls 143. Thus, in the state where the disk assembly 30 is seated on the try 14, the rotation shaft 320 may be parallel to the pair of first walls 142.

The sterilizer 15 may irradiate UV rays having an UV-C wavelength band onto the water to sterilize the water. The sterilizer 15 may be disposed on one of the pair of first walls 142 to effectively sterilize the water stored in the tray 14 in the state where the disk assembly 30 is seated on the tray 14.

If the sterilizer 15 is disposed on one of the pair of second walls 143, since the sterilizer 15 faces one disk 310 of the plurality of disks 310, the disk 310 blocks the UV rays irradiated from the sterilizer 15. Thus, the water may not be effectively sterilized.

On the other hand, if the sterilizer 15 is disposed on one of the pair of second walls 142, the UV rays irradiated from the sterilizer 15 may generally sterilize the water stored in the tray 14 by a distance between the plurality of disks 310 and a distance between the sterilizer 15 and the plurality of disks 310.

The sterilizer 15 may be separably mounted on an inner surface of the first wall 142 of the tray 14. In this specification, the inner surface of the first wall 142 may be a surface that contacts the stored water.

The sterilizer 15 may be separably mounted on the first wall 142 of the tray 14 in a vertical direction. A plurality of guide parts 144 for guiding the mounting of the sterilizer 15 may be disposed on the first wall 142. The plurality of guide parts 144 are horizontally spaced apart from each other. Also, the sterilizer 15 may be slidably mounted between the plurality of guide parts 144. Thus, the sterilizer 15 may be disposed between the plurality of guide parts 144 to prevent the sterilizer 15 from horizontally moving.

The sterilizer 15 may include a first body 151, a second body 153 coupled to the first body 151, a light emitting unit 157 accommodated into a space between the first body 151 and the second body 153 to irradiate the UV rays having the UV-C wavelength band, and a printed circuit board (PCB) 156 on which the light emitting unit 157 is disposed.

The first body 151 may be seated on the bottom wall 141 of the tray 14. Alternatively, the first body 151 may be seated on a connection portion between the bottom wall 141 and the first wall 142. To stably seat the first body 151 on the connection portion, the connection portion may be rounded, and also, the first body 151 may be rounded.

A guide rib 152 that interacts with each of the guide parts 144 disposed on the first wall 142 may be disposed on each of both side surfaces of the first body 151.

A protrusion 154 for allowing a user to easily separating the sterilizer 15 mounted on the tray 15 may be disposed on the second body 153. The user may lift the protrusion 154 by using fingers thereof to easily separate the sterilizer 15 from the tray 14.

A transmission part 155 through which the UV rays pass is disposed in the second body 153. For example, the transmission part 155 may be a hole.

For example, the light emitting unit 157 may be a light emitting diode (LED).

A pattern of the PCB and the light emitting unit 157 may be waterproofed. To prevent water passing through the transmission part 155 from passing between the first body 151 and the PCB 156, a sealing member 158 may be disposed between the first body 151 and the PCB 156.

For example, the sealing member 158 may be a double-sided tape, and the light emitting unit 157 may pass through the sealing member 158. The sealing member 158 may have one surface attached to an inner surface of the second body 153 and the other surface attached to the PCB 156. Since the second body 153 and the PCB 156 is fixed to each other by the sealing member 158, a separate structure for fixing the PCB 156 is unnecessary.

A wire 156A may be connected to the PCB 156, and then be connected to a terminal 159. A hole 151A through which the terminal 159 passes may be defined in the first body 151 or the second body 153.

In the state where the sterilizer 15 is mounted on the tray 14, the terminal 159 protrudes outward from the sterilizer 15.

In the state where the sterilizer 15 is mounted on the tray 14, the transmission part 155 or the light emitting unit 157 may be disposed at a position that is lower than a maximum water level at which water is maximally stored in the tray 14. Also, the transmission part 155 or the light emitting unit 157 may be disposed at the same position as a minimum water level or at a position that is lower than the minimum water level. For example, the light emitting unit 157 may be disposed lower than the rotation shaft 310.

Thus, since the light emitting unit 157 directly irradiates UV rays onto the water stored in the tray 14, the water stored in the tray 14 may be effectively sterilized.

Figure 5:
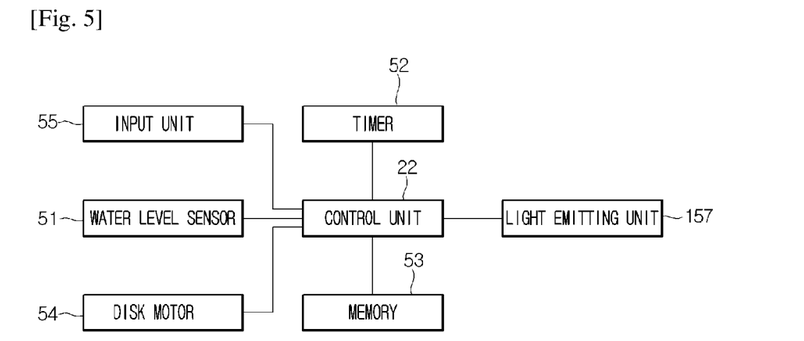
FIG. 5 is a control block diagram of the humidifier according to an embodiment.

FIG. 5 is a control block diagram of the humidifier according to an embodiment.

Referring to FIG. 5, the humidifier 1 may include a water level sensor 51 for detecting a water level within the tray 14, a disk motor 54 generating a power for rotating the rotation shaft 320 of the disk assembly 30, an input unit for inputting an operation command of the humidifier 1, and a control unit 22 controlling an operation of the light emitting unit 157 on the basis of the water level detected by the water level sensor 51.

The water level sensor 51 may detect a minimum water level and maximum water level within the tray 14. For example, the water level sensor 51 may detect the water level on the basis of capacitance, but is not limited thereto.

The humidifier 1 may further include a memory 53 in which an operation time (a turn-on time) of the light emitting unit 157 corresponding to the water level detected by the water level sensor 51 is stored and a timer 52 for measuring the turn-on time of the light emitting unit 157. Of cause, the control unit 22 may serve as the timer 52. In this case, the timer 52 may be omitted.

Figure 6:
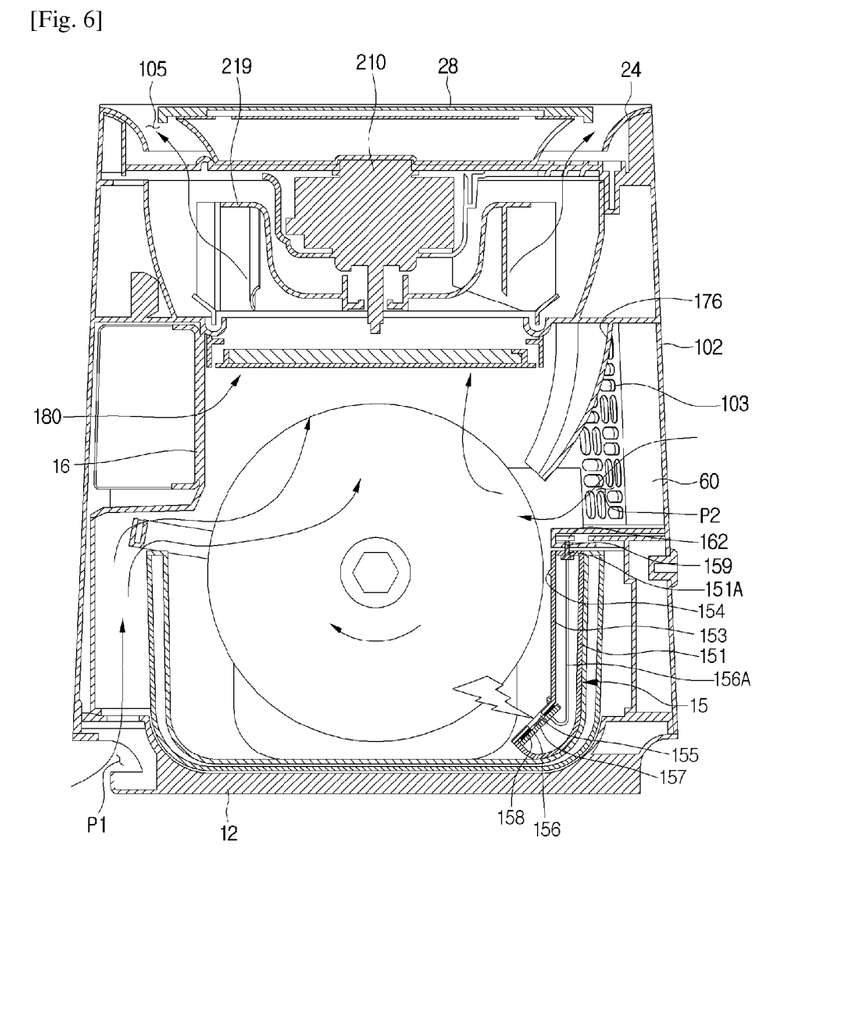
FIG. 6 is a vertical cross-sectional view of the humidifier according to an embodiment.

FIG. 6 is a vertical cross-sectional view of the humidifier according to an embodiment.

Referring to FIGS. 2 to 6, the case assembly 16 may be coupled to the tray 14 on which the sterilizer 15 is mounted. A contact plate 162 that contacts the terminal 159 protruding outward from the sterilizer 15 is disposed on the case assembly 16. The contact plate 162 may be electrically connected to the control unit 22.

A first suction passage P1 is defined in the base 12. An air guide 176 is defined in the case assembly 16. The air guide 176 guides air passing through the suction grill 102 to the disk assembly 30.

The suction grill 102 and the air guide 176 are spaced apart from each other. A second suction passage P2 is defined between the suction grill 102 and the air guide 176. Also, a filter 60 for filtering the suctioned air may be disposed in the second suction passage P2.

The fan motor assembly 20 includes a fan motor 210 and a fan 219 rotating by the fan motor 210.

Figure 7:
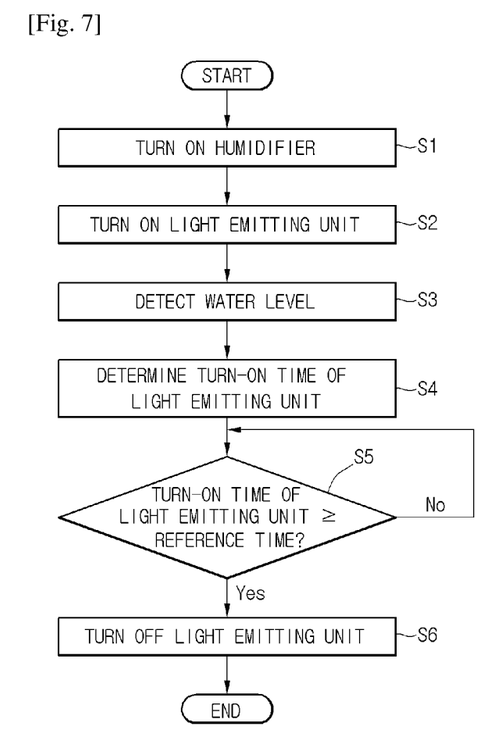
FIG. 7 is a flowchart for explaining a control method of the humidifier according to an embodiment.

FIG. 7 is a flowchart for explaining a control method of the humidifier according to an embodiment.

Referring to FIGS. 6 and 7, the humidifier is turned on in operation S1. Then, a starting button of the humidifier is selected. In operation S2, the control unit 22 turns on the light emitting unit 157. Also, the control unit 22 turns on the disk motor 192 and the fan motor 210.

Thus, the fan 219 rotates by the operation of the fan motor 210, and also, the rotation shaft 320 and the disk 310 rotate by the operation of the disk motor 54.

The disk 310 may rotate, for example, in a clockwise direction in FIG. 6. When the disk 310 rotates, the disk 310 wetted by water may be exposed to the outside of the tray 14.

When the fan 219 rotates, air may be suctioned into the humidifier 1 through the first suction passage P1 and the second suction passage P2.

Also, while the air suctioned through the first suction hole 103 flows upward to flow into a space between the disks 310 that are wetted by water, the air may contact the disks 310 to contain moisture.

The air suctioned through the second suction passage p2 passes through the filter 60 to flow toward the disk assembly 30 by the air guide 176. Also, the air suctioned through the second suction passage P2 may contain moisture while flowing into the space between the disks 310 wetted by the water to contact the disks 310.

When the light emitting unit 157 is turned on, the light emitting unit 157 may irradiate the UV rays having the UV-C wavelength band onto the water stored in the tray 14 to sterilizer the water stored in the tray 14.

In operation S3, the water level sensor 51 detects a water level within the tray 14. In operation S4, the control unit 22 determines the turn-on time of the light emitting unit 157 on the basis of the detected water level of the tray 14. That is, the control unit 22 compares the detected water level of the tray 14 to information stored in the memory 53 to determine the turn-on time (a reference time) corresponding to the detected water level of the tray 14.

Here, the turn-on time stored in the memory 53 may vary according to the water level of the tray 14. The more the water level decreases, the more the turn-on time of the light emitting unit 157 may decrease. That is, when the water is stored in the tray 140 at the maximum water level, the light emitting unit 157 may have the longest turn-on time. The more the water level decreases, the more the turn-one time decreases.

In operation S5, the control unit 22 determines whether the turn-on time of the light emitting unit 157 reaches the reference time. Here, the timer 52 operates at a time point at which the light emitting unit 157 is turned on to count a turn-on time of the light emitting unit 157.

In the determination result in the operation S5, when it is determined that the turn-on time of the light emitting unit 157 reaches the reference time, the control unit 22 turns off the light emitting unit 157 in operation S6.

According to the current embodiment, since the UV rays are directly irradiated onto the water stored in the tray 14, the sterilization effect with respect to the water stored in the stray may be maximized.

Figure 8:
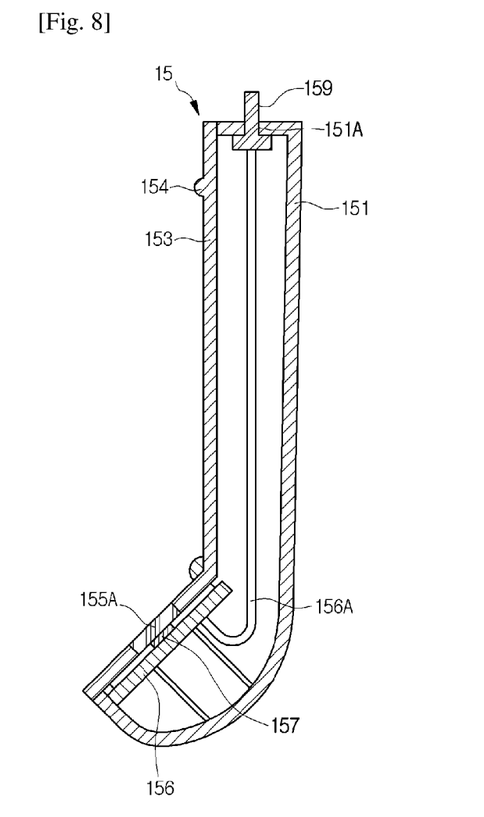
FIG. 8 is a cross-sectional view of a sterilizer according to another embodiment.

FIG. 8 is a cross-sectional view of a sterilizer according to another embodiment.

Referring to FIG. 8, a transmission part 155A formed of a transparent or translucent material is disposed in a second body 153 of a sterilizer according to the current embodiment. Also, a light emitting unit 157 and a PCB 156 may be disposed in a space between the second body 153 and a first body 151. Also, the PCB 156 may be supported by a support part. According to the current embodiment, a sealing member for blocking an inflow of water into the bodies may be unnecessary.

Figure 9:
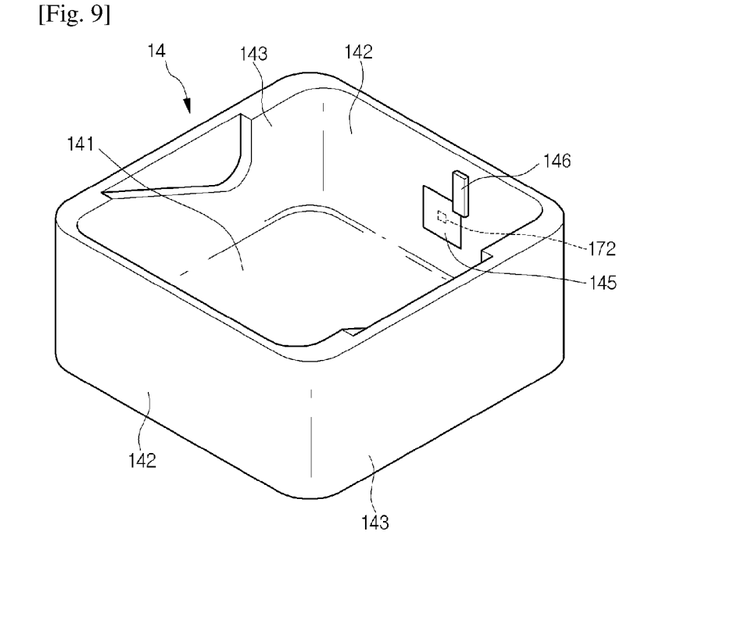
FIGS. 9 and 10 are perspective views of a tray in which a sterilizer is provided according to another embodiment.
Figure 10:
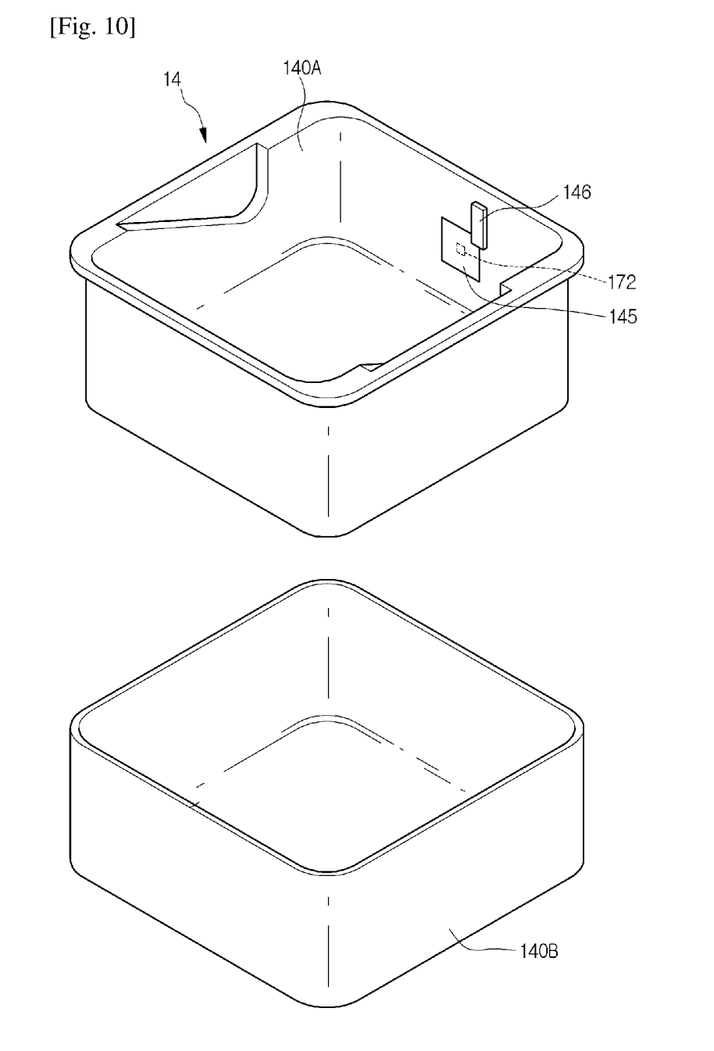
Figure 11:
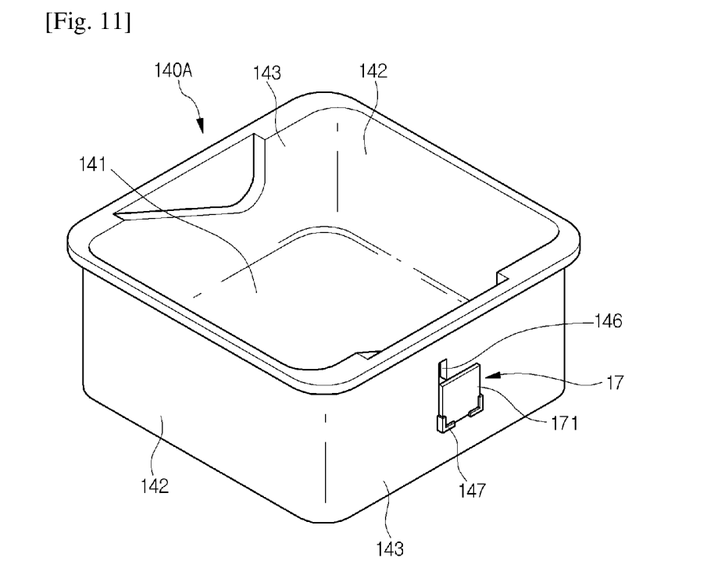
FIG. 11 is an exploded perspective view of the tray of FIG. 9.
Figure 12:
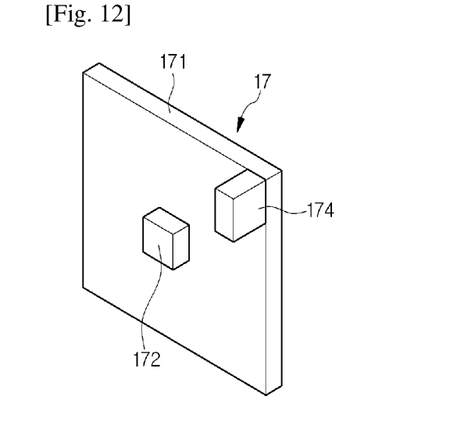
FIG. 12 is a perspective view of a light emitting unit and a printed circuit board which constitute the sterilizer of FIG. 9.
Figure 13:
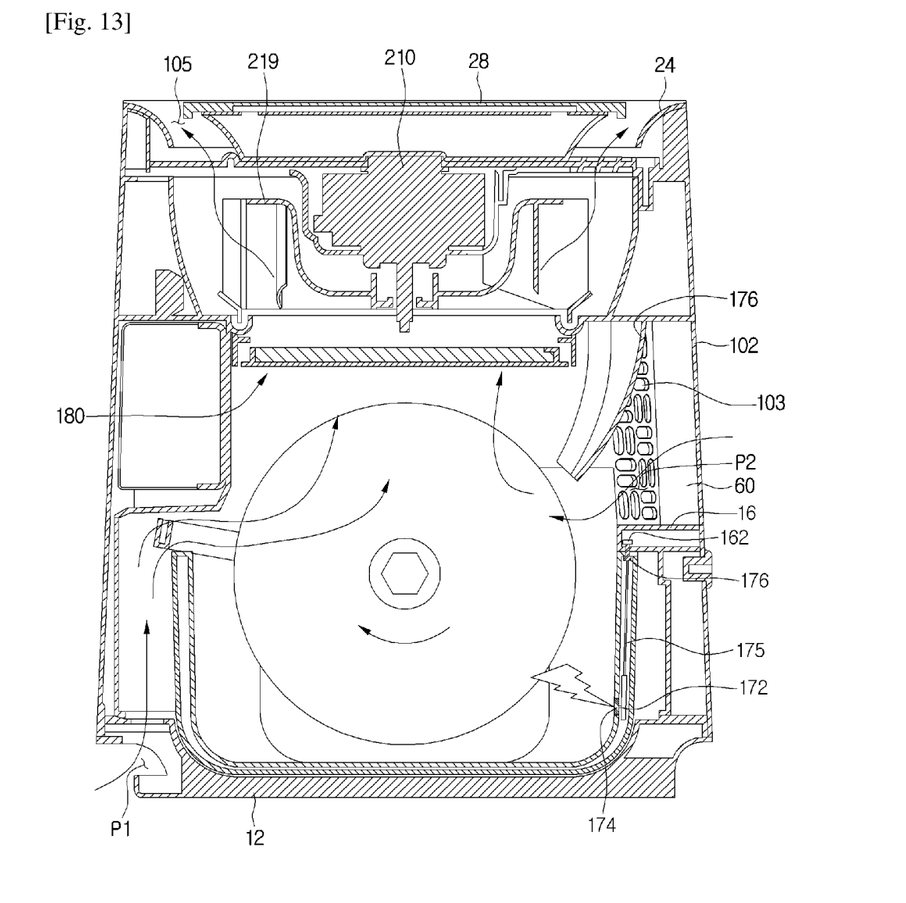
FIG. 13 is a cross-sectional view of a humidifier according to another embodiment.

FIGS. 9 and 10 are perspective views of a tray in which a sterilizer is provided according to another embodiment, FIG. 11 is an exploded perspective view of the tray of FIG. 9, FIG. 12 is a perspective view of a light emitting unit and a printed circuit board which constitute the sterilizer of FIG. 9, and FIG. 13 is a cross-sectional view of a humidifier according to another embodiment.

Referring to FIGS. 9 to 13, a tray 14 according to the current embodiment may include an inner body 140A defining a space in which water is stored and an outer body 140B coupled to the inner body 140A.

Also, a sterilizer 17 is disposed between the inner body 140A and the outer body 140B. That is, the sterilizer 17 is disposed outside the space in which the water is stored.

The sterilizer 17 may include a light emitting unit 172 may include a light emitting unit 172 irradiating UV rays having a UV-C wavelength band and a PCB 171 on which the light emitting unit 172 is disposed.

A transmission part 145 through which the UV rays irradiated from the light emitting unit 172 is transmitted may be disposed in the inner body 140A. The transmission part 145 may be formed of a transparent or translucent material.

A mount guide 146 for guiding the mounting of the PCB 171 is disposed on an inner surface (that is a surface contacting water) of the inner body 140A. An outer surface of the inner body 140A may be recessed toward the inner surface of the inner body 140A to form the mount guide 146. Thus, the mount guide 146 may protrude from the inner surface of the inner body 140A.

A plurality of support parts 147 for supporting the PCB 171 may be disposed on the outer surface of the inner body 140A. The plurality of support parts 147 may be horizontally spaced apart from each other. The PCB 171 may be slidably inserted between the plurality of support parts 147.

A guide protrusion 174 inserted into the mount guide 146 may be disposed on the PCB 171.

When the PCB 171 moves downward in the state where the guide protrusion 171 is inserted into the mount guide 146, the PCB 171 is seated on the plurality of support parts 147, and the light emitting unit 172 faces the transmission part 145.

A wire 175 may be connected to the PCB 171, and then be connected to a terminal 176. The terminal 176 passes through the inner body 140A or the outer body 140B to protrude upward from the tray 14. Also, a contact plate 162 that contacts the terminal protruding upward from the tray 14 is disposed on a case assembly 16.

According to the current embodiment, since the sterilizer is disposed between the inner body and the outer body which constitute the tray, damage of the sterilizer may be prevented. Also, since a portion protruding from the inner surface of the tray is minimized, the tray may be easily cleaned.

Although the sterilizer is disposed on the sidewall of the tray 14 in FIG. 13, the present disclosure is not limited thereto. For example, the sterilizer may be disposed on the bottom wall of the tray 14.

Also, FIG. 12 illustrates a state in which the tray is disposed between the inner body and the outer body. On the other hand, the tray may be disposed on a single body, and the sterilizer may be mounted on an outer surface of the body.

Although the humidifier includes the sterilizer in the foregoing embodiments, the humidifier may be applied to an air cleaner or conditioner having a humidification function.

Also, although the humidifier includes the disk assembly to perform the humidification in a natural vaporizing manner, the ideas of the present disclosure may be applied to a water storage part of a humidifier that performs the humidification by using an ultrasonic vibrator disposed on one side of the tray.

Thus, in this specification, the disk assembly or ultrasonic vibrator that operates to perform the humidification may be called a humidification assembly.

Components may be coupled to one another to form a single body or to operate as a single body according to the embodiment are coupled, but the present disclosure is not limited thereto. That is, one or more components are selectively coupled and operated within the scope of the present disclosure. The terms "comprising," "including," and "having," as used in the claims and specification herein, shall be considered as indicating an open group that may include other elements not specified. Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A humidifier comprising:
a tray in which water for humidification is stored;
a humidification assembly disposed on one side of the tray to operate for the humidification; and
a sterilizer disposed on the tray to sterilize the water stored in the tray,
wherein the sterilizer comprises a light emitting unit irradiating UV rays and a printed circuit board on which the light emitting unit is disposed, and
the light emitting unit is disposed at a position that is lower than a maximum water level of the water stored in the tray.

2. The humidifier according to claim 1, wherein the light emitting unit irradiates UV rays having a UV-C wavelength band.

3. The humidifier according to claim 1, further comprising:
a water level sensor to detect a water level of the water stored in the tray; and
a control unit to control a turn-on time of the light emitting unit on the basis of the water level detected by the water level sensor.

4. The humidifier according to claim 3, wherein the control unit controls the turn-on time so that the turn-on time of the light emitting unit gradually decreases when the water level detected by the water level sensor gradually decreases.

5. The humidifier according to claim 1, further comprising a case assembly to guide a flow of air for the humidification,
wherein the sterilizer further comprises a wire connected to the printed circuit board and a terminal connected to the wire, and
the case assembly comprises a contact plate connected to the control unit and the terminal.

6. The humidifier according to claim 5, wherein the sterilizer further comprises a body surrounding the light emitting unit and the printed circuit board, and
the terminal passes through the body to contact the contact plate.

7. The humidifier according to claim 5, wherein the terminal passes through the tray to contact the contact plate.

8. The humidifier according to claim 1, wherein the sterilizer is separably mounted on an inner surface of the tray to contact the water stored in the tray.

9. The humidifier according to claim 8, wherein the sterilizer comprises a transmission part through which the UV rays irradiated from the light emitting unit is transmitted, and
the sterilizer further comprises a body accommodating the printed circuit board.

10. The humidifier according to claim 9, wherein the transmission part comprises a hole, and
a sealing member to block an inflow of the water is disposed between an inner surface of the body and the printed circuit board.

11. The humidifier according to claim 9, wherein the transmission part is formed of a transparent or translucent material to allow the UV rays irradiated from the light emitting unit to be transmitted therethrough.

12. The humidifier according to claim 9, wherein a guide rib is disposed on the body, and
a guide part coupled to the guide rib is disposed on the tray.

13. The humidifier according to claim 1, wherein the tray comprises a body having a transmission part and defining a space in which the water is stored, and
the sterilizer is mounted outside the space in which the water is stored.

14. The humidifier according to claim 13, wherein a mount guide for guiding the mounting of the sterilizer is disposed on the tray, and a guide protrusion inserted into the mount guide is disposed on the printed circuit board.

15. The humidifier according to claim 14, wherein a support part supporting the printed circuit board is disposed on the tray.

16. The humidifier according to claim 13, wherein the tray comprises an inner body comprising the transmission part and an outer body coupled to the inner body, and
the sterilizer is disposed between the inner body and the outer body.

17. The humidifier according to claim 1, wherein the humidification assembly comprises a rotation shaft and a plurality of disks connected to the rotation shaft to rotate together with the rotation shaft, and the sterilizer is disposed on a circumferential wall that extends in parallel to the rotation shaft.

18. A humidifier comprising:
a base;
a tray seated on the base;
a disk assembly seated on the tray, the disk assembly comprising a rotation shaft and a plurality of disks connected to the rotation shaft; and
a sterilizer disposed on the tray, the sterilizer comprising a light emitting unit irradiating UV rays onto water stored in the tray,
wherein the light emitting unit is disposed lower than the rotation shaft.

19. The humidifier according to claim 18, wherein the light emitting unit irradiates UV rays having a UV-C wavelength band.

20. The humidifier according to claim 18, wherein the sterilizer is disposed on a wall of the tray, which is disposed in parallel to the rotation shaft.

* * * * *